United States Patent [19]

Asszonyi et al.

[11] 4,245,926
[45] Jan. 20, 1981

[54] WELDED GRID, PRIMARILY FOR SECURING UNDERGROUND CAVITIES, CAVITY SYSTEMS, AS WELL AS PROCESS FOR MAKING THE GRID

[75] Inventors: Csaba Asszonyi, Budapest; István Klausz, Sárisáp; Istvan Kmety, Dorog; Nándor Meitzen; Rezsö Pasztor, both of Budapest, all of, Hungary

[73] Assignee: Magyar Szénbányászati Tröszt, Tatabanya, Hungary

[21] Appl. No.: 906,779

[22] Filed: May 17, 1978

[30] Foreign Application Priority Data

May 17, 1977 [HU] Hungary ............................. MA 2875

[51] Int. Cl.³ ............................................. E21D 11/00
[52] U.S. Cl. ..................................... 405/150; 52/664; 52/650; 405/146
[58] Field of Search ................... 405/150; 52/664, 663, 52/660, 654, 650, 649, 648; 29/160, 161, 155 R

[56] References Cited

U.S. PATENT DOCUMENTS

| 3,347,007 | 10/1967 | Hale | 52/650 X |
| 3,381,479 | 5/1968 | Curzio | 405/150 |
| 3,407,560 | 10/1968 | Baumann | 29/155 R X |
| 3,672,022 | 6/1972 | York | 52/664 X |
| 3,748,720 | 7/1973 | Versteeg | 52/650 X |
| 3,751,869 | 8/1973 | McDonald et al. | 52/650 |

FOREIGN PATENT DOCUMENTS 1013641  7/1952  France ........................ 52/664

Primary Examiner—Dennis L. Taylor

[57] ABSTRACT

Welded grid structure for securing underground cavities such as mine roads, consisting of two sets or grid systems of parallel straight bars disposed in parallel planes and connected by welding to a third set of bars that extend perpendicular to the first two sets of bars. The bars of the third set are bent to enable them to intersect the planes of the first and second sets but not all intersection points are welded. The non-welded points are in accordance with a predetermined scheme as a result of which the grid system is rigid in the principal direction along the straight bars of the first two sets but is flexible along a direction perpendicular thereto. A process for making the grid structure is also disclosed.

4 Claims, 5 Drawing Figures

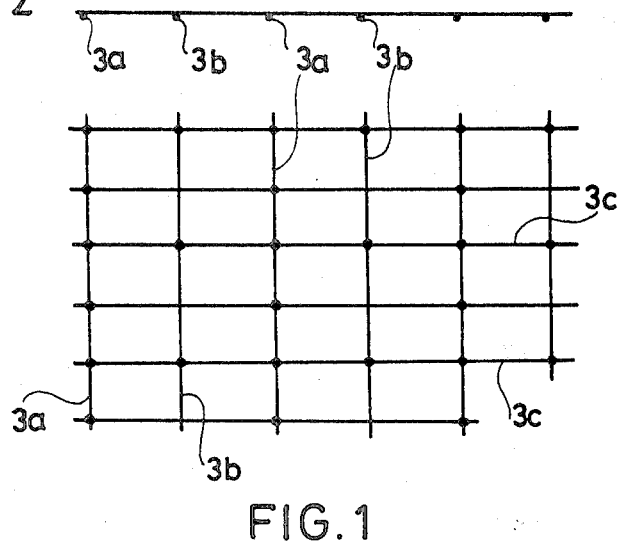
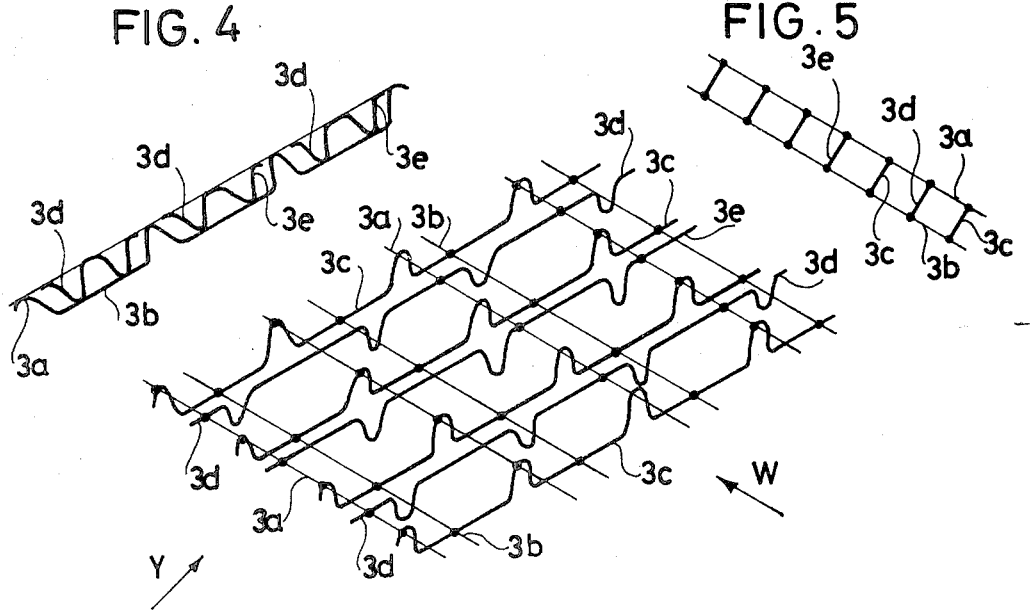

WELDED GRID, PRIMARILY FOR SECURING UNDERGROUND CAVITIES, CAVITY SYSTEMS, AS WELL AS PROCESS FOR MAKING THE GRID

The invention concerns a welded grid suitable for securing underground cavities and cavity systems, such as mine roads, especially those filled with shot concrete, as well as a process for producing a thus formed grid.

It has long been known in mining to employ a planar lattice grid as a lagging wall in conjunction with steel arches used for the mine roads.

In this function the sole and exclusive role of the lattice grid is the prevention of rock spalling. The grid is not suitable for taking up rock pressure.

A construction known from the literature for securing underground cavities can be found in the German Patent No. 1,555,409. According to this technical solution a flexible lattice grid is employed as a lagging wall for securing an annular mine road.

The German Patents Nos. 1,164,348 and 1,169,396 describe constructions wherein the lattice grids serving as laggings are strengthened by stiffening rods extending in the direction of the roadway axis. The ends of the rods are bent, and they are connected to the steel arches.

The German Patent No. 1,169,875 teaches that the individual members of the lattice grid can be combined with profiled rails and bent plate carriers to secure free fields between the steel arches.

According to the German Patent No. 1,843,310 similarly planar lattice grids are employed the ends of which are rigidified by jointing.

According to the state of the art grid systems serving to secure underground cavities are always coplanar.

The invention originates from the observation that the bending strength of a steric supporting grid structure gives rise to a possiblity of taking up extra loads, which has not hitherto been recognized.

The invention accordingly covers a grid structure, particularly for securing mine roads, the characteristic feature of which should be considered in that it consists of mutually perpendicular or nearly perpendicular bars, preferably united by welding, wherein one bar system consists of parallel straight bars while the other bar system—which is expediently formed perpendicular to the first-named, —is formed of such bars that have a bent section, and of which system the bars are uniformly shortened, and the bent sections are preferably geometrical formations of the same character, and the straight bars are always in two mutually parallel planes.

A preferred embodiment of the invention consists in that the spatial grid system is axially symmetrically formed along its straight bars.

The invention also relates to the manufacture of the grid system, which can be characterized in that in a first working step a lattice grid is formed by welding from straight bars, wherein intersection points without joints are formed between the transition points with predetermined, cyclically repeated skips; then—in a second phase—a individual elements of the same row of bars are bent, along a segment that is formed by the skipped points, so that the bends are identical according to the same projection shortening, and thus the lattice grid becomes a spatial grid.

The use of the thus stressed spatial grid is particularly useful for concrete construction. The straight segments of the spatial grid are preferably pre-tensioned when applying the concrete.

In order to illustrate the invention, the description is accompanied by drawings, wherein FIG. 1 is a plan view of an exemplary welded planar lattice grid;

FIG. 2 is a side view of the grid of FIG. 1;

FIG. 3 shows a spatial grid or framework axonometrically;

FIG. 4 shows a grid system, viewed in a direction W; and

FIG. 5 the same in a direction Y.

The spatial grid or framework according to the invention consists of a bar system, one plane of the grid being defined by bars $3a$ while the other plane is defined by bars $3b$. These parts are constituted by straight members.

Periodically bent bars $3c$, $3d$, $3e$ are perpendicular to the bars $3a$ and $3b$, which together constitute a bar system.

This system is in the form of a planar lattice grid which is not welded together at each intersection. At certain locations the intersections are left without welding. The network of the grid, illustrated by way of example, can be characterized—as regards the welded and unwelded intersection points—as follows, wherein the numeral 1 signifies welded points, while 0 signifies unwelded cross points:

1 1 1 1 1 1 1
1 0 1 0 1 0 1
1 1 1 1 1 1 1
1 0 1 0 1 0 1
1 1 1 1 1 1 1

A further example for network formation can be seen in the following, where the significance of the numeral 1 and of zero is identical to the above mentioned roles:

1 1 1 1 1 1 1
1 0 1 0 1 0 1
0 1 0 1 0 1 0
1 1 1 1 1 1 1

If the bars $3c$, $3d$, $3e$—which are in the same row or column—are bent so that each bar is subjected to the same bending length, then the perpendicular grid bars $3a$, $3b$ remain straight.

In this way a spatial grid framework is formed in which a flexural strength of several times is attained, and the rigidity is considerably more favorable along the individual, arbitrary lines—in comparison to the planar lattice grid.

In accordance with the invention, the perpendicularly arranged steel bars or wires are formed into a lattice grid by welding. The cross-sections of the perpendicular bars can be different.

As a first phase of the process, a planar network is produced [see FIG. 1].

In a s econd process phase the lattice grid is transformed into a spatial grid so that the bars $3c$, $3d$, $3e$ are bent with a bending tool, where the welds have been skipped, the tool displaying conform bending lines with respect to each bent bar. A complete network can be formed in a single procedural step. Thus the planar lattice grid becomes a spatial grid or framework [see FIG. 3].

The thus formed spatial framework is rigid in a direction W but flexible in a direction Y, as can be seen on FIGS. 4 and 5.

The rigidity of the spatial framework in the W direction is achieved by the fact that the bars $3a$, $3b$ running in this direction are straight while the perpendicular bars 3c, 3d, 3e maintain their flexibility. This flexibility is to be attributed to pivots formed at "corners" of the bends.

In the exemplary embodiment this arrangement is shown in FIG. 4. It will be clear from FIG. 5 that each zone, that is, the bars 3a, 3b, form a continuous straight line, according to the direction Y. The bending strength of the system is consequently high in the transverse direction.

The inventive grid system can be filled with concrete, and consequently works together with the concrete. Thus it constitutes a load-bearing reinforced concrete structure, or reinforced concrete shell, which is suitable for taking up a shear force of any direction.

The great advantage of the invention consists in that its material requirement is not considerable, and the manufacturing technology displays a favorable productivity. The grid can easily be transported in the form of panels [also on a closed path]. As a spatial framework it includes elements that are proper for the respective zones, axially aligned elements, and some that connect them and run transversely, which are not only suitable to accommodate shear forces but can assure the best statical characteristics.

If the cavities are supported by monolithic concrete, the grid according to the invention can be advantageously applied. It readily adapts itsel to the curvatures of the cavity, and may even be pre-stressed. It promotes the adhesion of shot concrete. Since the walls of the cavity are subject to pressure and bending, the grid is also suitable for taking up shear forces while the zone-corrected as well as the perpendicular, transverse bars that connect the increments are equally suitable to take up forces that act from several directions.

A further advantage of the inventive grid consists in that the construction which has additionally been formed into a spatial grid or framework is most advantageous for receiving sprayed concrete but it does not exclude the use of other expedients of building technology, known per se [for example sliding-form lagging technology]. This advantage may be increased by pre-stressing the straight bars in the course of applying the concrete.

We claim:

1. A welded grid for securing cavity walls such as in mine roads or the like, comprising: a first grid system comprising two sets of substantially straight spaced apart parallel first bars, wherein each set lies in a single plane parallel to that of the other set with the bars of the two sets alternately disposed with respect to each other; and a second grid system welded to the first grid system and comprising second bars, each having cyclically alternating straight portions disposed substantially perpendicularly to the first bars and bent portions projecting from the straight portions and lying in a single plane parallel to that of the other second bars and configured to span the distance between the two planes of the first grid system from the straight portions to the ends of the projecting bent portions and wherein the second bars are alternately inverted with the straight portions alternately adjacent to one set of first bars and then the other and with the bent portions of every other second bar alighend with each other and with a straight portion of the adjacent second bars.

2. The grid according to claim 1, wherein the planes of said second bars are substantially perpendicular to the planes of the first bars.

3. The grid according to claim 1, wherein the grid is axially symmetical along the first bars.

4. An armature grid for concrete for securing subterranean cavities such as mine sections, comprising: two rows of substantially straight spaced apart parallel longitudinal rods, with each row lying a different parallel plane and wherein the rods of the two rows are alternately disposed, crosswise rods welded to the longitudinal rods at crossing points and each having periodic straight portions disposed substantially perpendicular to the longitudinal rods and lying in one row plane and bent portions having the end points thereof lying in the other row plane and wherein the bent portions of adjacent crosswise rods are displaced from each other in the lengthwise direction by a distance less than the distance between the two row planes.

* * * * *